(12) United States Patent
Lei et al.

(10) Patent No.: US 11,723,067 B2
(45) Date of Patent: Aug. 8, 2023

(54) SUPPORTING CROSS-TAG SCHEDULING AND 2-STEP RACH PAYLOAD TRANSMISSION FOR A PDCCH-ORDERED CONTENTION-FREE RANDOM ACCESS PROCEDURE

(71) Applicant: QUALCOMM Incorporated, San Diego, CA (US)

(72) Inventors: Jing Lei, San Diego, CA (US); Kazuki Takeda, Tokyo (JP); Seyedkianoush Hosseini, San Diego, CA (US); Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/929,925

(22) Filed: Jul. 15, 2020

(65) Prior Publication Data

US 2021/0022180 A1 Jan. 21, 2021

Related U.S. Application Data

(60) Provisional application No. 62/875,768, filed on Jul. 18, 2019.

(51) Int. Cl.
| | |
|---|---|
| *H04W 4/00* | (2018.01) |
| *H04W 74/08* | (2009.01) |
| *H04L 5/00* | (2006.01) |
| *H04L 5/10* | (2006.01) |

(Continued)

(52) U.S. Cl.
CPC ....... *H04W 74/0808* (2013.01); *H04L 5/0051* (2013.01); *H04L 5/10* (2013.01);
(Continued)

(58) Field of Classification Search
None
See application file for complete search history.

(56) References Cited

U.S. PATENT DOCUMENTS

| | | |
|---|---|---|
| 2013/0064165 A1 | 3/2013 | Chen et al. |
| 2013/0188613 A1* | 7/2013 | Dinan ............... H04W 36/0072 370/336 |

(Continued)

OTHER PUBLICATIONS

International Search Report and Written Opinion—PCT/US2020/070284—ISA/EPO—dated Sep. 30, 2020.

(Continued)

*Primary Examiner* — Zewdu A Beyen
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may receive, via a first cell, downlink control information for physical downlink control channel ordered contention-free random access, wherein the downlink control information indicates a timing advance group of a second cell and one or more parameters associated with a random access message to be transmitted by the UE via the second cell, wherein the first cell and the second cell belong to different timing advance groups. The UE may transmit the random access message via the second cell according to the one or more parameters and a timing advance value determined based at least in part on the timing advance group of the second cell. Numerous other aspects are provided.

30 Claims, 10 Drawing Sheets

(51) Int. Cl.
H04W 72/0446 (2023.01)
H04W 74/02 (2009.01)
H04W 72/23 (2023.01)

(52) U.S. Cl.
CPC ....... *H04W 72/0446* (2013.01); *H04W 72/23* (2023.01); *H04W 74/02* (2013.01); *H04W 74/0833* (2013.01)

(56) References Cited

U.S. PATENT DOCUMENTS

| | | | | |
|---|---|---|---|---|
| 2018/0020441 | A1* | 1/2018 | Lo | H04W 72/044 |
| 2020/0107369 | A1* | 4/2020 | Jeon | H04W 74/0833 |
| 2020/0267774 | A1* | 8/2020 | Vos | H04L 1/1861 |
| 2020/0351801 | A1* | 11/2020 | Jeon | H04W 52/48 |

OTHER PUBLICATIONS

Huawei, et al., "RACH Type Switching Between 2-steps, 4-steps RACH and CFRA", 3GPP Draft, R2-1907733, Discussion on RACH Type Switching Between 2-steps, 4-steps RACH and CFRA, 3rd Generation Partnership Project (3GPP), Mobile Competence Centre, 650, Route Des Lucioles, F-06921, vol. Ran WG2, No. Reno, Nevada, US, Apr. 13, 2019-May 17, 2019, May 13, 2019 (May 13, 2019), XP051731164, 7 pages, Retrieved from the Internet: URL: http://www.3gpp.org/ftp/Meetings%5F3GPP%5FSYNC/RAN2/Docs/R2%2D1907733%2Ezip. [retrieved on May 13, 2019] the whole document.
International Search Report and Written Opinion—PCT/US2020/070284—ISA/EPO—Sep. 30, 2020.
VIVO: "Remaining Issues of Cross-Carrier Scheduling with Mix Numerologies", 3GPP Draft; R1-1906183 Remaining Issues of Cross-Carrier Scheduling with Mix Numerologies, 3rd Generation Partnership Project (3GPP), Mobile Competence Centre, 650, Route Des Lucioles, F-06921, vol. Ran WG2, No. Reno, USA, May 13, 2019-May 17, 2019, May 13, 2019 (May 13, 2019), XP051727637, 6 pages, Retrieved from the Internet: URL: http://www.3gpp.org/ftp/Meetings%5F3GPP%5FSYNC/RAN1/Docs/R1%2D1906183%2Ezip [retrieved on May 13, 2019].

* cited by examiner

SUPPORTING CROSS-TAG SCHEDULING AND 2-STEP RACH PAYLOAD TRANSMISSION FOR A PDCCH-ORDERED CONTENTION-FREE RANDOM ACCESS PROCEDURE

CROSS-REFERENCE TO RELATED APPLICATION

This Patent Application claims priority to U.S. Patent Application No. 62/875,768, filed on Jul. 18, 2019, entitled "SUPPORTING CROSS-TAG SCHEDULING AND 2-STEP RACH PAYLOAD TRANSMISSION FOR A PDCCH-ORDERED CONTENTION-FREE RANDOM ACCESS PROCEDURE," and assigned to the assignee hereof. The disclosure of the prior Application is considered part of and is incorporated by reference in this Patent Application.

FIELD OF THE DISCLOSURE

Aspects of the present disclosure generally relate to wireless communication and to techniques and apparatuses for supporting cross-timing advance group (TAG) scheduling and 2-step random access channel (RACH) payload transmission for a physical downlink control channel (PDCCH)-ordered contention-free random access procedure.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving, via a first cell, downlink control information for physical downlink control channel ordered contention-free random access, wherein the downlink control information indicates a timing advance group of a second cell and one or more parameters associated with a random access message to be transmitted by the UE via the second cell, wherein the first cell and the second cell belong to different timing advance groups; and transmitting the random access message via the second cell according to the one or more parameters and a timing advance value determined based at least in part on the timing advance group of the second cell.

In some aspects, a method of wireless communication, performed by a UE, may include receiving downlink control information for physical downlink control channel ordered contention-free random access, wherein the downlink control information indicates one or more parameters associated with a random access message to be transmitted by the UE as part of a two-step random access procedure; and transmitting the random access message for the two-step random access procedure according to the one or more parameters.

In some aspects, a UE for wireless communication may include memory and one or more processors coupled to the memory. The memory and the one or more processors may be configured to receive, via a first cell, downlink control information for physical downlink control channel ordered contention-free random access, wherein the downlink control information indicates a timing advance group of a second cell and one or more parameters associated with a random access message to be transmitted by the UE via the second cell, wherein the first cell and the second cell belong to different timing advance groups; and transmit the random access message via the second cell according to the one or more parameters and a timing advance value determined based at least in part on the timing advance group of the second cell.

In some aspects, a UE for wireless communication may include memory and one or more processors coupled to the memory. The memory and the one or more processors may be configured to receive downlink control information for physical downlink control channel ordered contention-free random access, wherein the downlink control information indicates one or more parameters associated with a random access message to be transmitted by the UE as part of a two-step random access procedure; and transmit the random access message for the two-step random access procedure according to the one or more parameters.

In some aspects, a non-transitory computer-readable medium may store one or more instructions for wireless communication. The one or more instructions, when executed by one or more processors of a UE, may cause the one or more processors to: receive, via a first cell, downlink control information for physical downlink control channel ordered contention-free random access, wherein the downlink control information indicates a timing advance group of a second cell and one or more parameters associated with a random access message to be transmitted by the UE via the second cell, wherein the first cell and the second cell belong to different timing advance groups; and transmit the random access message via the second cell according to the one or more parameters and a timing advance value determined based at least in part on the timing advance group of the second cell.

In some aspects, a non-transitory computer-readable medium may store one or more instructions for wireless communication. The one or more instructions, when executed by one or more processors of a UE, may cause the one or more processors to: receive downlink control information for physical downlink control channel ordered contention-free random access, wherein the downlink control information indicates one or more parameters associated with a random access message to be transmitted by the UE as part of a two-step random access procedure; and transmit the random access message for the two-step random access procedure according to the one or more parameters.

In some aspects, an apparatus for wireless communication may include means for receiving, via a first cell, downlink control information for physical downlink control channel ordered contention-free random access, wherein the downlink control information indicates a timing advance group of a second cell and one or more parameters associated with a random access message to be transmitted by the apparatus via the second cell, wherein the first cell and the second cell belong to different timing advance groups; and means for transmitting the random access message via the second cell according to the one or more parameters and a timing advance value determined based at least in part on the timing advance group of the second cell.

In some aspects, an apparatus for wireless communication may include means for receiving downlink control information for physical downlink control channel ordered contention-free random access, wherein the downlink control information indicates one or more parameters associated with a random access message to be transmitted by the apparatus as part of a two-step random access procedure; and means for transmitting the random access message for the two-step random access procedure according to the one or more parameters.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
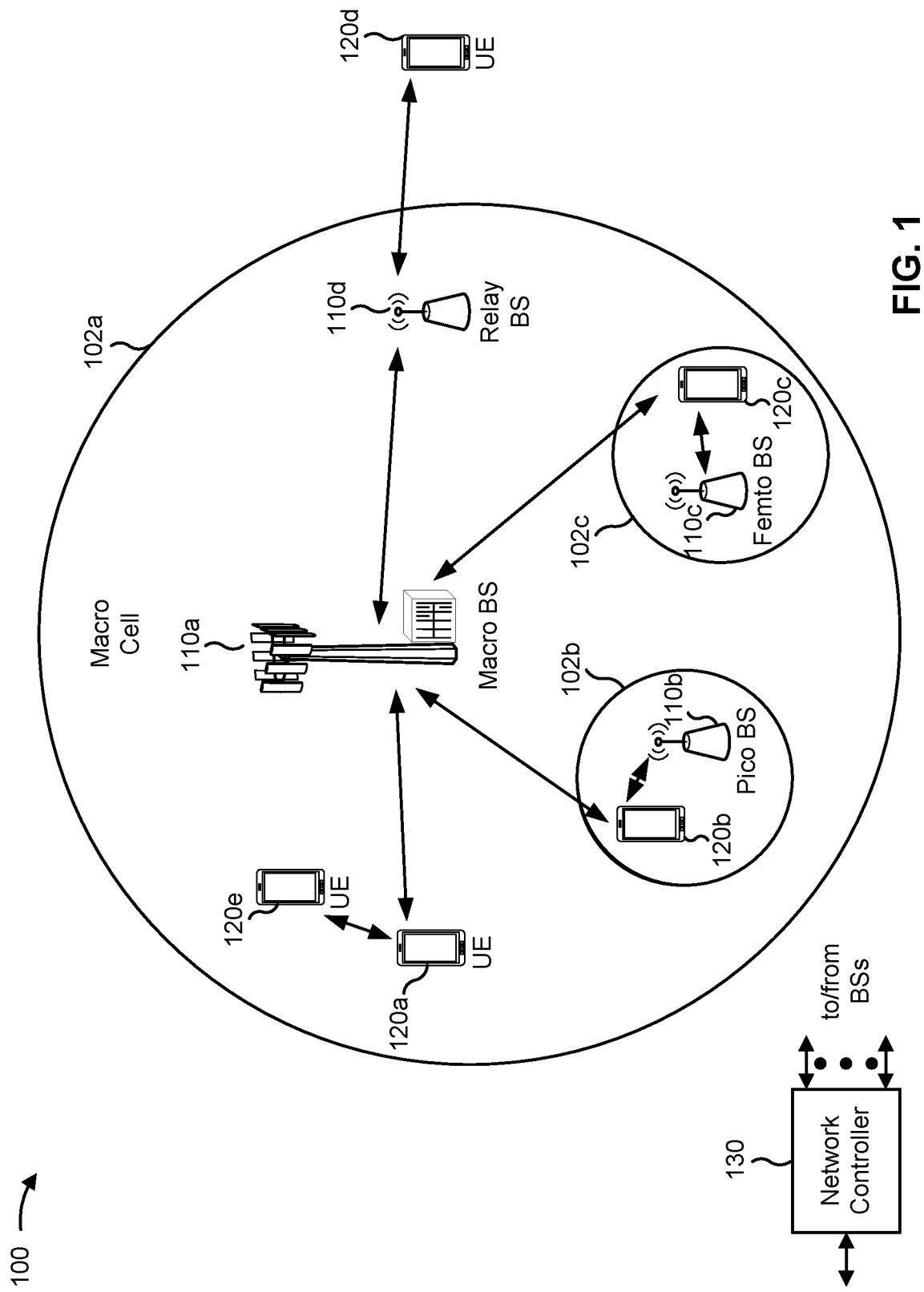
FIG. 1 is a block diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
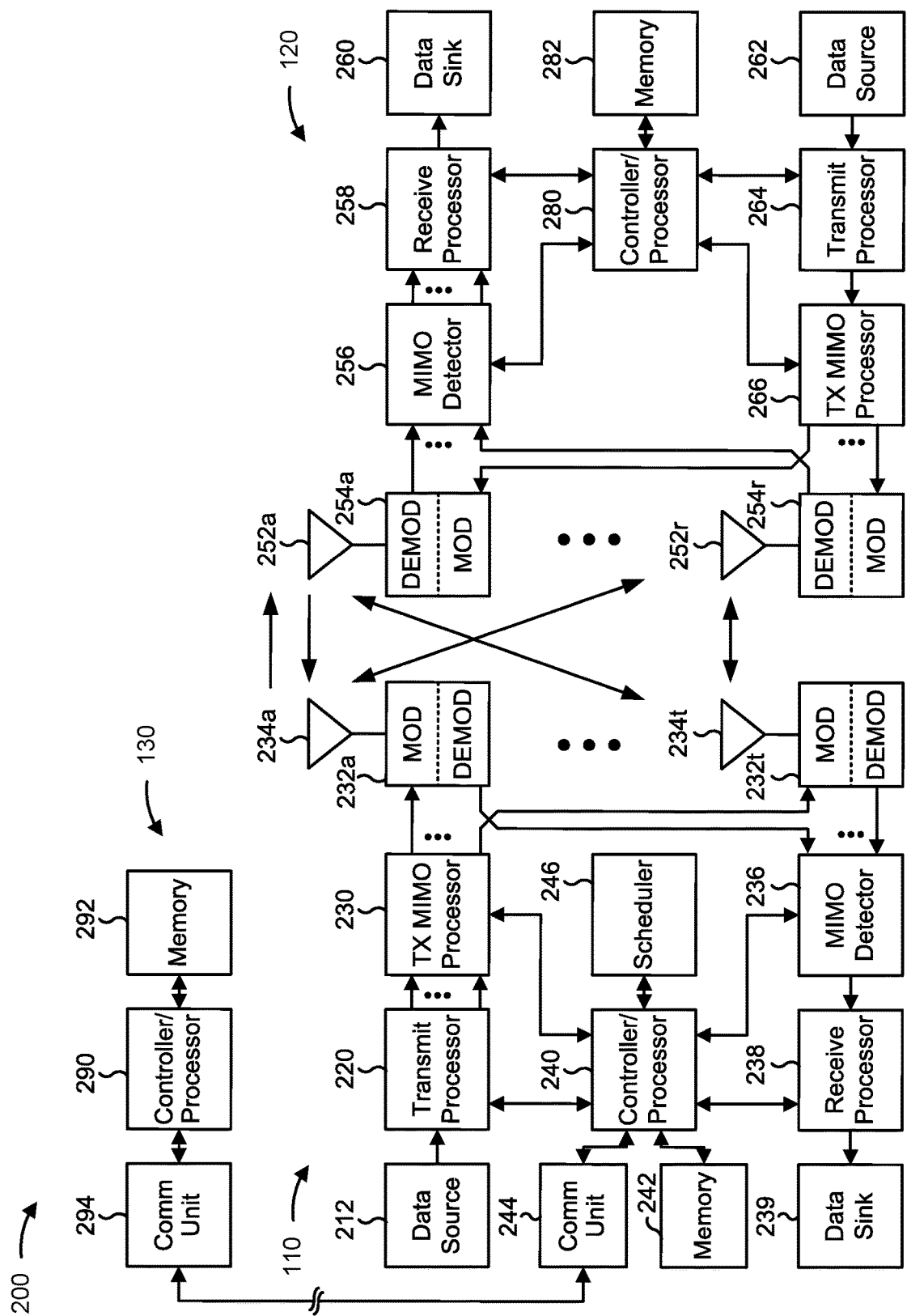
FIG. 2 is a block diagram illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with cross-timing advance group (TAG) scheduling and 2-step random access channel (RACH) payload transmission for a physical downlink control channel (PDCCH)-ordered contention-free random access procedure, as described in more detail elsewhere herein. For example, controller/processor 240 of base station 110, controller/processor 280 of UE 120, and/or any other component(s) of FIG. 2 may perform or direct operations of, for example, process 900 of FIG. 9, process 1000 of FIG. 10, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 900 of FIG. 9, process 1000 of FIG. 10, and/or other processes as described herein. A scheduler 246 may schedule UEs for data transmission on the downlink and/or uplink.

In some aspects, UE 120 may include means for receiving, via a first cell, downlink control information for physical downlink control channel ordered contention-free random access, wherein the downlink control information indicates a timing advance group of a second cell and one or more parameters associated with a random access message to be transmitted by the UE via the second cell, wherein the first cell and the second cell belong to different timing advance groups; means for transmitting the random access message via the second cell according to the one or more parameters and a timing advance value determined based at least in part on the timing advance group of the second cell;

and/or the like. Additionally, or alternatively, UE 120 may include means for receiving downlink control information for physical downlink control channel ordered contention-free random access, wherein the downlink control information indicates one or more parameters associated with a random access message to be transmitted by the UE as part of a two-step random access procedure; means for transmitting the random access message for the two-step random access procedure according to the one or more parameters; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

Figure 3:
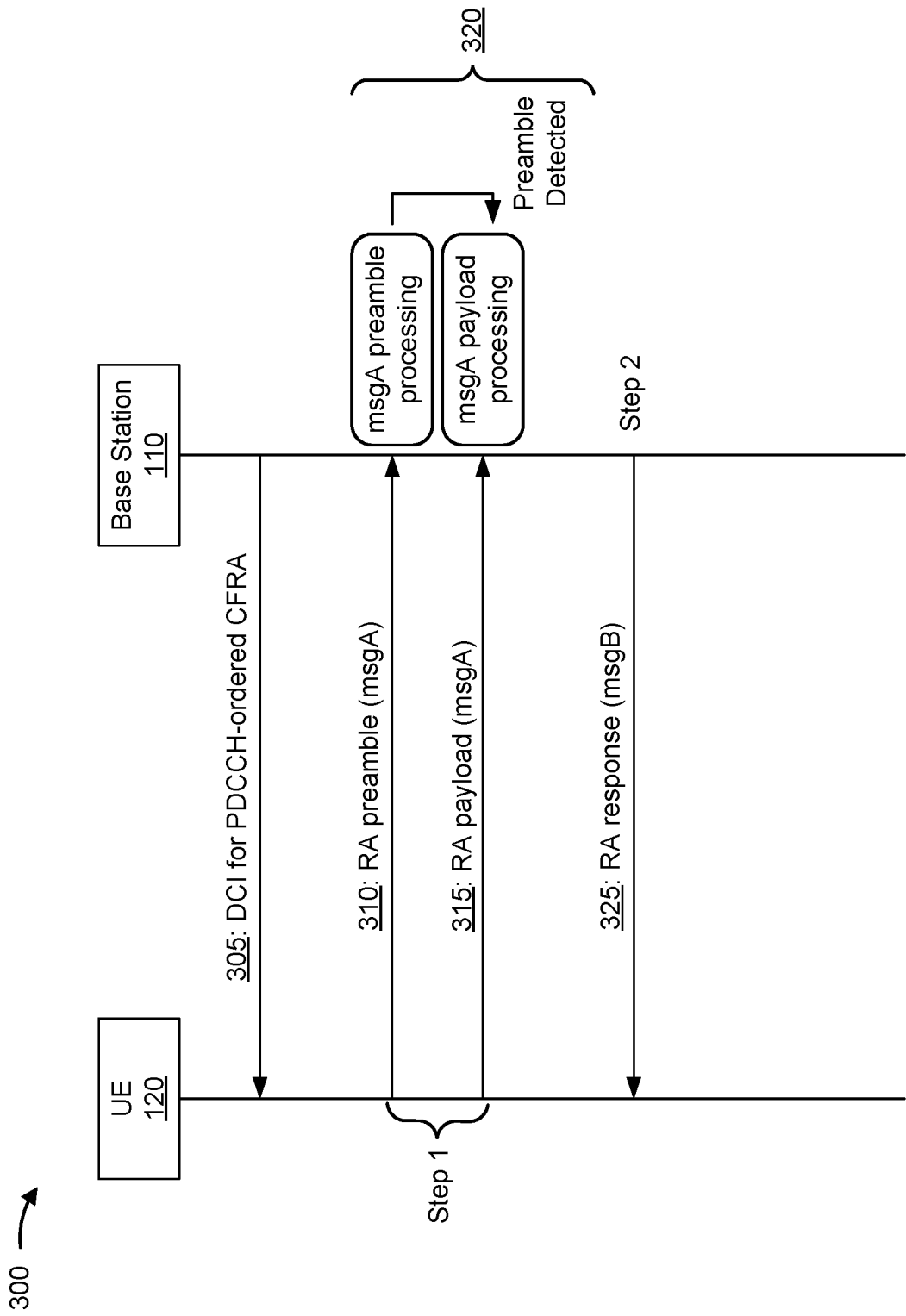
FIG. 3 is a diagram illustrating an example of a two-step random access channel (RACH) procedure using PDCCH-ordered contention-free random access (CFRA).

FIG. 3 is a diagram illustrating an example 300 of a two-step random access channel (RACH) procedure using physical downlink control channel (PDCCH)-ordered contention-free random access (CFRA). As shown in FIG. 3, a base station 110 and a UE 120 may communicate with one another to perform the two-step RACH procedure.

As shown by reference number 305, the base station 110 may transmit, and the UE 120 may receive, downlink control information (DCI) for PDCCH-ordered CFRA (sometimes referred to as a PDCCH order). In some aspects, the base station 110 may trigger PDCCH-ordered CFRA to synchronize transmission timing for a UE 120 that has lost synchronization (e.g., that is out-of-synchronization). For example, the base station 110 may trigger PDCCH-ordered CFRA when a time alignment timer expires due to lack of transmission of uplink data or downlink data between the base station 110 and the UE 120. The base station 110 may transmit a PDCCH order (e.g., DCI for PDCCH-ordered CFRA) to the UE 120 based at least in part on triggering the PDCCH-ordered CFRA. The DCI for PDCCH-ordered CFRA in New Radio (NR) may have a DCI format of 1_0. The DCI may indicate one or more parameters for performing a random access procedure, such as a random access preamble to be transmitted by the UE 120.

As shown by reference number 310, the UE 120 may transmit a random access (RA) preamble. As shown by reference number 315, the UE 120 may transmit a random access payload. As shown, the UE 120 may transmit the random access preamble and the random access payload as part of a first step of the two-step RACH procedure. The random access message (e.g., that includes the random access preamble and the random access payload) is sometimes referred to as message A, msgA, or a first message in a two-step RACH procedure. The random access preamble is sometimes referred to as a message A preamble, a msgA preamble, or a preamble. The random access payload is sometimes referred to as a message A payload, a msgA payload, or a payload. The random access message may include some or all of the contents of message 1 (msg1) and message 3 (msg3) of a four-step RACH procedure. For example, the random access preamble may include some or all of the contents of message 1 (such as a RACH preamble). For PDCCH-ordered CFRA, the UE 120 may use a random access preamble indicated by the DCI for PDCCH-ordered CFRA (e.g., having DCI format 1_0). The random access payload may include some or all of the contents of message 3 (such as a UE identifier, uplink control information, a physical uplink shared channel (PUSCH) communication, and/or the like). Additionally, or alternatively, the random access payload may include a channel state information (CSI) report, a position measurement, a buffer status report (BSR), a power headroom (PHR) report, beam failure recovery (BFR) information, and/or the like.

As shown by reference number 320, the base station 110 may receive the random access preamble transmitted by the UE 120. If the base station 110 successfully receives and decodes the random access preamble, the base station 110 may then receive and decode the random access payload. As shown by reference number 325, the base station 110 may transmit a random access response (sometimes referred to as a random access response message). As shown, the base station 110 may transmit the random access response as part of a second step of the two-step RACH procedure. The random access response is sometimes referred to as message B, msgB, or a second message in a two-step RACH procedure. The random access response may include some or all of the contents of message 2 (msg2) and message 4 (msg4) of a four-step RACH procedure. For example, the random access response may include the detected RACH preamble identifier, the detected UE identifier, a timing advance value, contention resolution information, and/or the like.

As indicated above, FIG. 3 is provided as an example. Other examples may differ from what is described with regard to FIG. 3.

Figure 4:
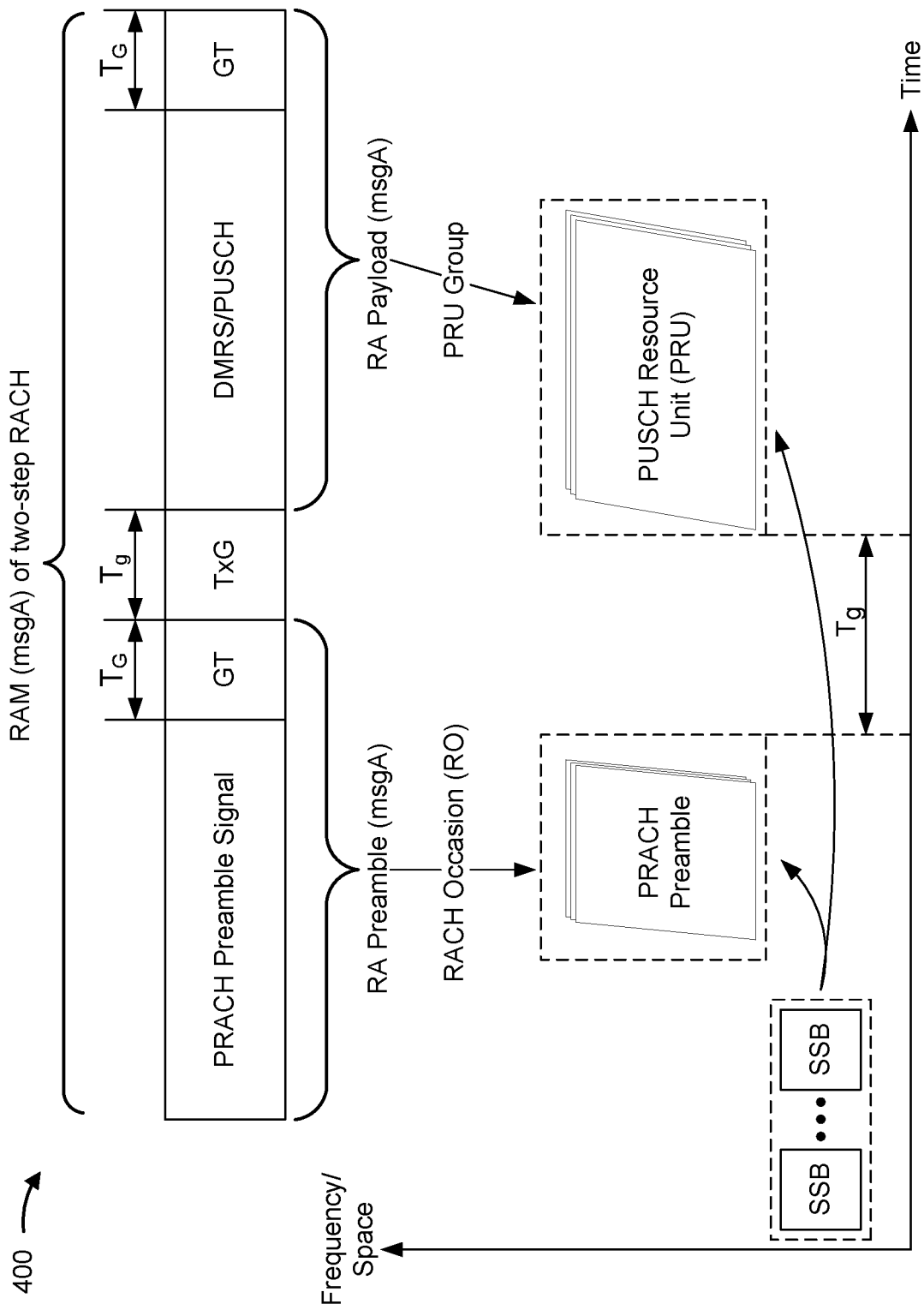
FIG. 4 is a diagram illustrating an example of a random access message that includes a random access message preamble and a random access message payload.

FIG. 4 is a diagram illustrating an example 400 of a random access message that includes a random access message preamble and a random access message payload. As shown, a random access message transmitted by the UE 120 as part of the two-step RACH procedure may include a random access (RA) preamble and a random access payload, as described above. The random access preamble may include a physical random access channel (PRACH) preamble signal, and may be separated from other signals using a guard time (shown as GT, with a duration of $T_G$). The random access payload may include a demodulation reference signal (DMRS) and/or a physical uplink shared channel (PUSCH) communication, and may be separate from other signals using a guard time (also shown as GT, with a duration of $T_G$). As further shown, transmission of the random access preamble and transmission of the random access payload may be separated in time by a transmission guard time (shown as TxG, with a duration of $T_g$).

As further shown, the random access preamble may be transmitted in a RACH occasion (RO), which may correspond to a synchronization signal block (SSB) in contention-based random access (CBRA). As also shown, the random access payload may be transmitted in a PUSCH resource unit (PRU) group, may correspond to an SSB in CBRA. In CBRA, the UE 120 may determine resources (e.g., the RO and/or the PRU group) for transmission of the random access message based at least in part on the SSB. For example, an SSB index of the best SSB measured by the UE 120 may correspond to a set of uplink resources for transmission of the random access message in CBRA. For CBRA, the UE 120 may randomly select a preamble (e.g., a sequence) for transmission in the random access preamble. By associating RACH resources with an SSB, signaling overhead may be reduced that would otherwise be used to indicate the RACH resources.

In CFRA, the 2-step RACH procedure is DCI-based rather than SSB-based. In this case, to support CFRA, the DCI for PDCCH-ordered CFRA indicates a preamble (e.g., a sequence) to be transmitted by the UE 120 in the random access preamble. However, DCI format 1_0, which is used for PDCCH-ordered CFRA, may primarily be used to provide control information for downlink transmissions, such as physical downlink shared channel (PDSCH) transmissions, RA response transmissions (e.g., msgB, msg2, msg4, and/or the like), system information (e.g., one or more system information blocks (SIBs)), and/or the like. Consequently, the DCI for PDCCH-ordered RACH may not include sufficient information for the UE 120 to transmit a random access message. For example, DCI format 1_0 may not include a resource allocation for transmission of the random access message (e.g., the random access preamble and/or the random access payload) and/or other parameters for the random access message to be transmitted by the UE 120. Some techniques and apparatuses described herein enable PDCCH-ordered CFRA.

Furthermore, in some scenarios, such as dual connectivity and/or carrier aggregation, different cells or uplink carriers may be configured in different timing advance groups (TAGs). For example, a first uplink carrier and a second uplink carrier may have different propagation delays between the UE 120 and corresponding base stations 110, which may not be co-located. For example, a first serving cell for the first uplink carrier may be provided by a first base station 110 (e.g., a first TRP, a first antenna array of a base station 110, and/or the like), and a second serving cell for the second uplink carrier may be provided by a second base station 110 (e.g., a second TRP, a second antenna array of a base station 110, and/or the like) that is not co-located with the first base station 110, resulting in different propagation delays for uplink transmissions to reach a respective base station 110 on the different uplink carriers. As a result, the first uplink carrier and the second uplink carrier may have different timing advance values for uplink transmissions, and may belong to different timing advance groups. A timing advance group may refer to a set of uplink carriers that have the same (or similar within a threshold value) timing advance values. A UE 120 may use a timing advance value for an uplink carrier to transmit an uplink communication on the uplink carrier with a timing that results in synchronization of transmission time intervals (TTIs) with a base station 110, to reduce inter-TTI interference.

In some cases (e.g., in dual connectivity and/or carrier aggregation), cross-carrier scheduling may be supported, where a first carrier (e.g., on a first cell) carries control information to schedule communications on a second carrier (e.g., on a second cell). When the first carrier and the second carrier belong to different TAGs, this cross-carrier scheduling may be referred to as cross-TAG scheduling. For cross-TAG scheduling, a TAG of a second carrier (e.g., a secondary TAG or sTAG) scheduled by a first carrier (that is included in a primary TAG or pTAG) may need to be indicated via the first carrier. However, DCI format 1_0 for PDCCH-ordered RACH may not include such information. Some techniques and apparatuses described herein enable cross-TAG scheduling for PDCCH-ordered CFRA.

As indicated above, FIG. 4 is provided as an example. Other examples may differ from what is described with regard to FIG. 4.

Figure 5:
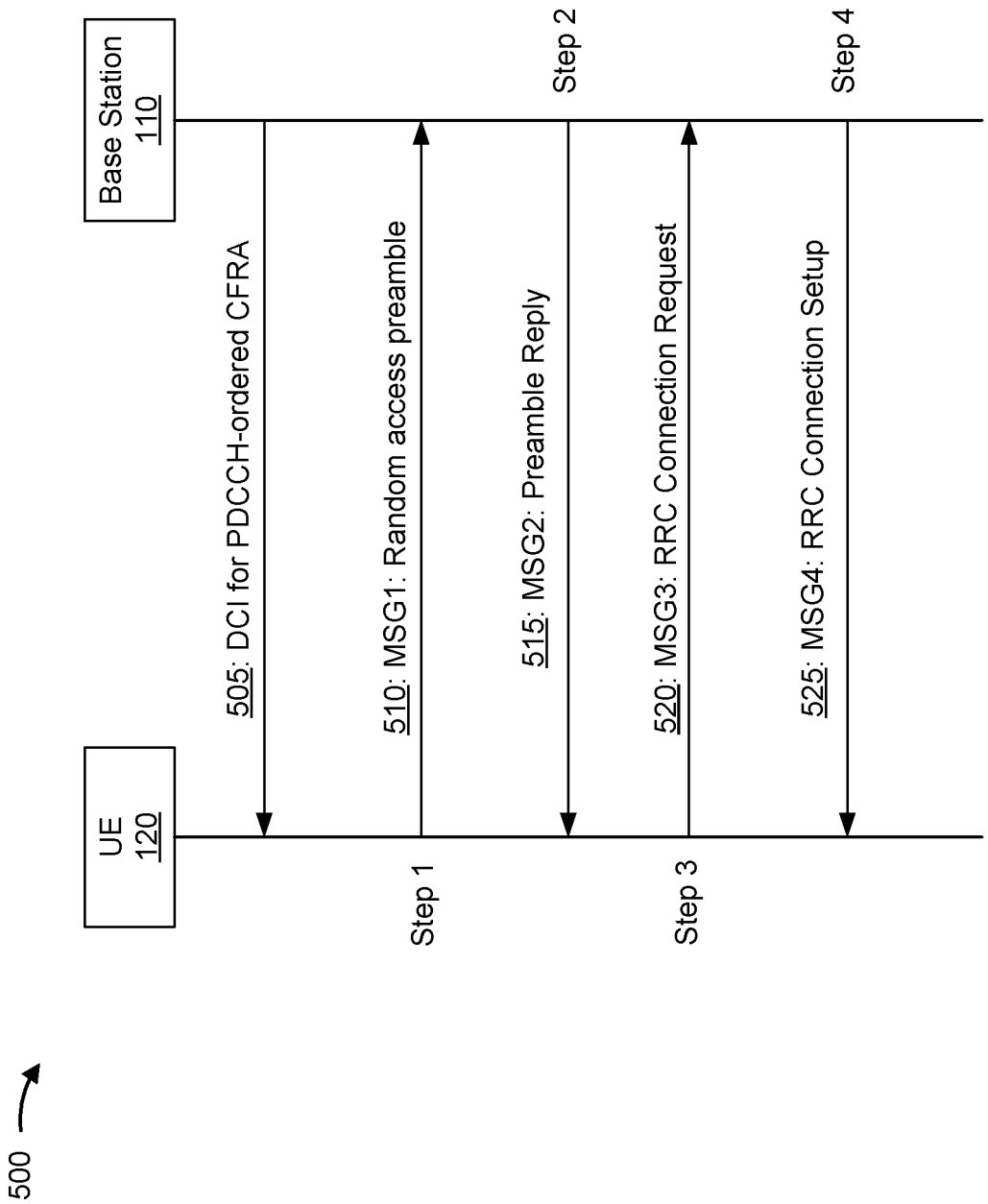
FIG. 5 is a diagram illustrating an example of a four-step RACH procedure using PDCCH-ordered CFRA.

FIG. 5 is a diagram illustrating an example 500 of a four-step RACH procedure using PDCCH-ordered CFRA. As shown in FIG. 5, a base station 110 and a UE 120 may communicate with one another to perform the four-step RACH procedure.

As shown by reference number 505, the base station 110 may transmit, and the UE 120 may receive, DCI for PDCCH-ordered CFRA (sometimes referred to as a PDCCH order). In some aspects, the base station 110 may trigger PDCCH-ordered CFRA to synchronize transmission timing for a UE 120 that has lost synchronization (e.g., that is out-of-synchronization), as described above in connection with FIG. 3. The DCI for PDCCH-ordered CFRA in NR may have a DCI format of 1_0. The DCI may indicate one or more parameters for performing a random access procedure, such as a random access preamble to be transmitted by the UE 120.

As shown by reference number 510, the UE 120 may transmit a random access (RA) preamble (sometimes referred to as RACH preamble, PRACH preamble, and/or the like). The message that includes the random access preamble may be referred to as a message 1, msg1, MSG1, or a first message of a four-step RACH procedure. For PDCCH-ordered CFRA, the UE 120 may use a random access preamble indicated by the DCI for PDCCH-ordered CFRA (e.g., having DCI format 1_0).

As shown by reference number 515, the base station 110 may transmit a reply to the preamble. The message that includes the preamble reply may be referred to as message 2, msg2, MSG2, or a second message of a four-step RACH procedure. In some aspects, the preamble reply may indicate the detected RACH preamble identifier (e.g., received from the UE 120 in MSG1). Additionally, or alternatively, the preamble reply may indicate a resource allocation to be used by the UE 120 to transmit message 3 (msg3).

As shown by reference number 520, the UE 120 may transmit a radio resource control (RRC) connection request message. The RRC connection request message may be referred to as message 3, msg3, MSG3, or a third message of a four-step RACH procedure. In some aspects, the RRC connection request may include a UE identifier, uplink control information, a PUSCH communication (e.g., an RRC connection request), and/or the like.

As shown by reference number 525, the base station 110 may transmit an RRC connection setup message. The RRC connection setup message may be referred to as message 4, msg4, MSG4, or a fourth message of a four-step RACH procedure. In some aspects, the RRC connection setup message may include the detected UE identifier, a timing advance value, and/or the like.

As indicated above, NR may not support cross-TAG scheduling in PDCCH-ordered CFRA because DCI format 1_0 for PDCCH-ordered RACH may not include information that permits the UE 120 to determine an sTAG of a carrier being scheduled. Some techniques and apparatuses described herein enable cross-TAG scheduling for PDCCH-ordered CFRA in NR (e.g., for two-step RACH and four-step RACH).

As indicated above, FIG. 5 is provided as an example. Other examples may differ from what is described with regard to FIG. 5.

Figure 6:
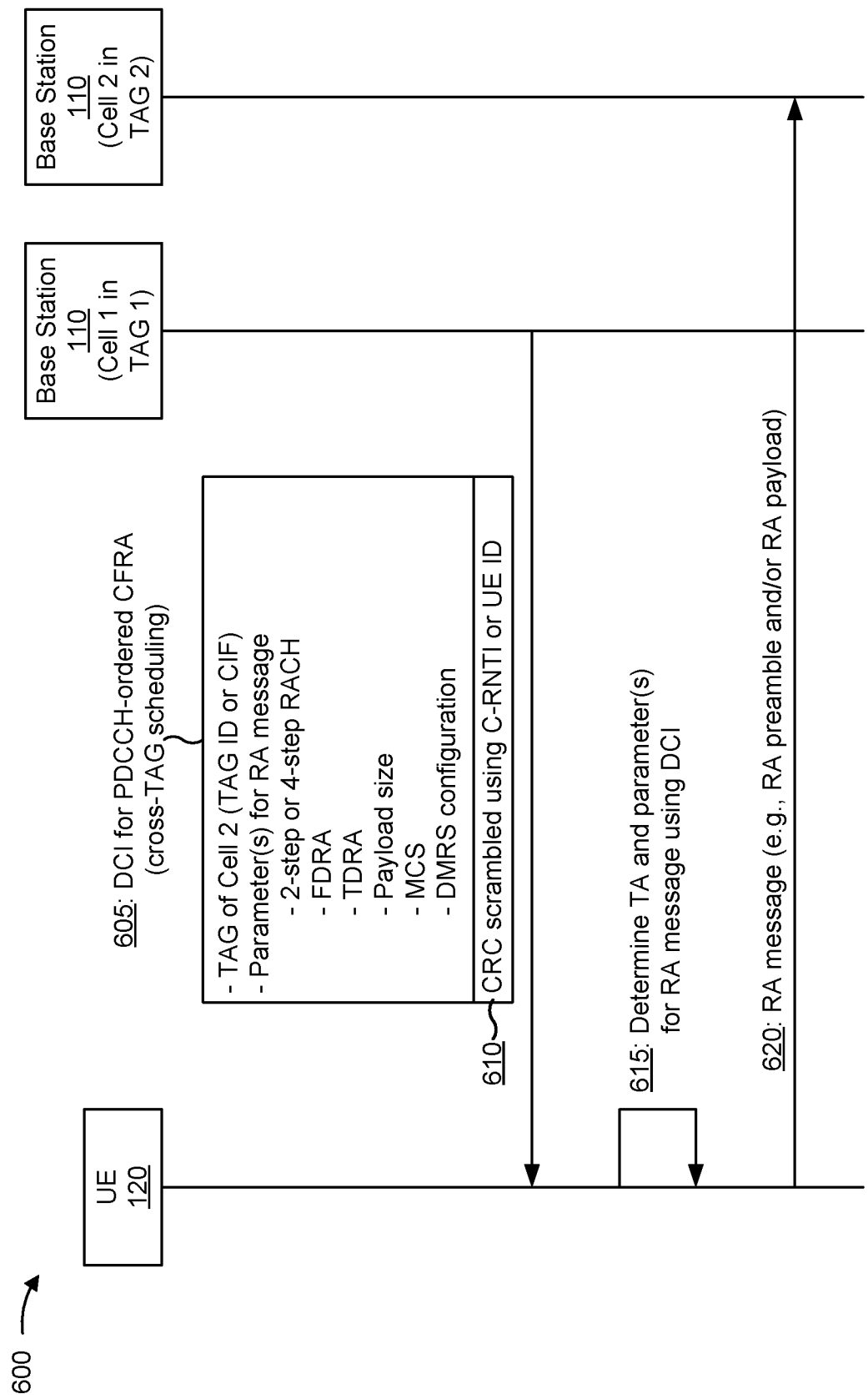
FIGS. 6-8 are diagrams illustrating examples of supporting cross-timing advance group (TAG) scheduling and 2-step random access channel (RACH) payload transmission for a physical downlink control channel (PDCCH)-ordered contention-free random access procedure, in accordance with various aspects of the present disclosure.

FIG. 6 is a diagram illustrating an example 600 of supporting cross-TAG scheduling and 2-step RACH payload transmission for a PDCCH-ordered CFRA procedure, in accordance with various aspects of the present disclosure.

As shown in FIG. 6, a UE 120 may communicate with a base station 110 using a first cell (shown as Cell 1) that is included in a first TAG (shown as TAG 1). The first cell may be a primary cell (PCell), and the first TAG may be a pTAG. The first cell may schedule communications for a second cell (shown as Cell 2) that is included in a second TAG (shown as TAG 2) that is different from the first TAG. Thus, the first cell and the second cell may belong to different TAGs. The second cell may be a secondary cell (SCell), and the second TAG may be an sTAG. The first cell and the second cell may be provided by the same base station 110 or by different base stations 110.

Figure 7:
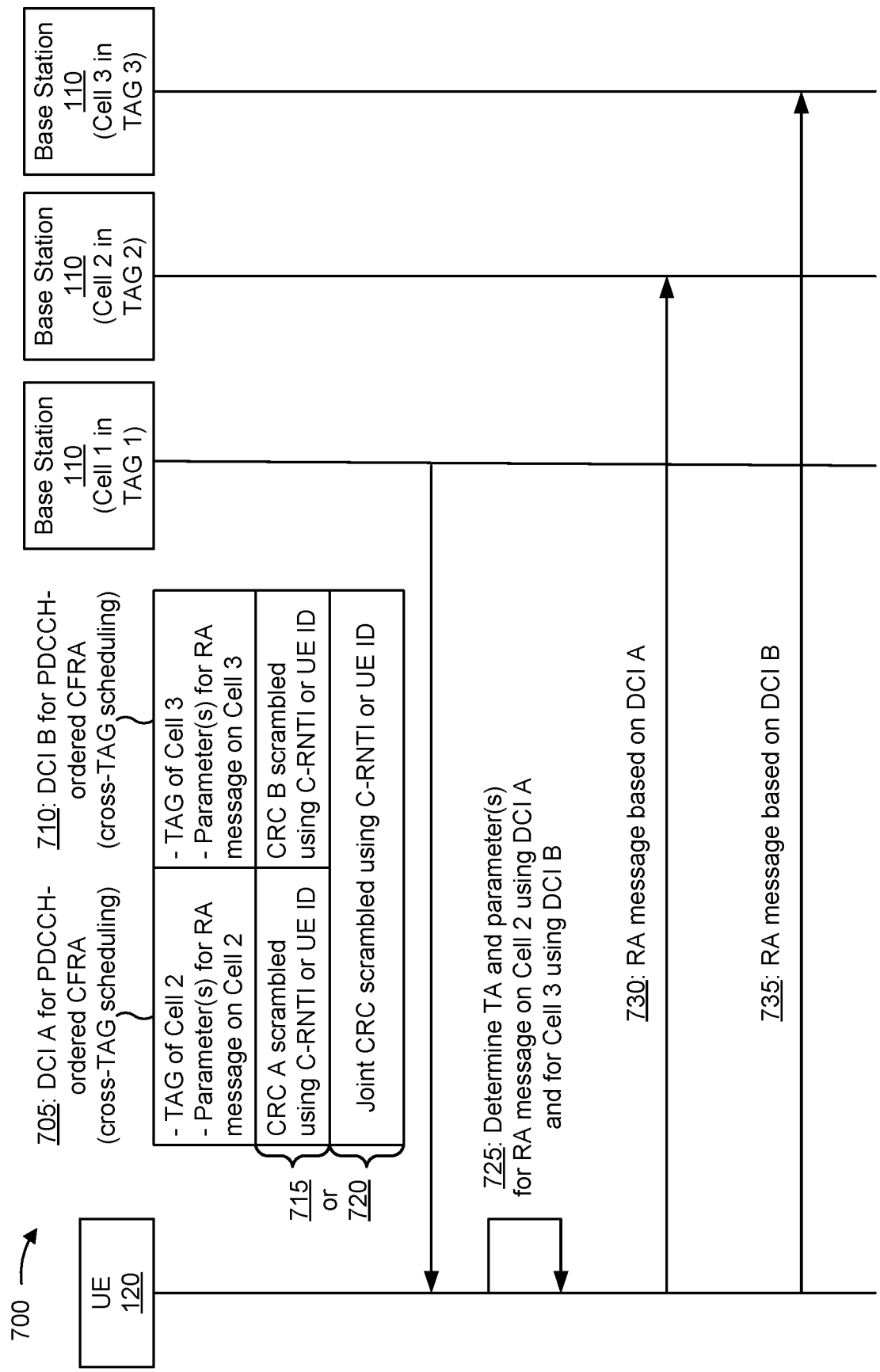

In some aspects, the sTAG of the second cell is not configured with a scheduling cell (e.g., a scheduling SCell). In some aspects, all other sTAGs associated with the UE 120, other than the second cell, are configured with a scheduling cell (e.g., according to an RRC configuration). In this case, a single DCI may be used to support cross-TAG scheduling for the sTAG of the second cell (e.g., using a set of reserved bits included in the DCI having format 1_0 for PDCCH-ordered CFRA). Due to size constraints of the DCI (e.g., a limitation on the number of bits included in the DCI), if multiple sTAGs are not configured with a scheduling cell (e.g., a scheduling SCell), then a single DCI may not have a sufficient number of available bits to support cross-TAG scheduling for multiple sTAGs. FIG. 6 shows details for cross-TAG scheduling for a single sTAG. FIG. 7, described below, shows details for cross-TAG scheduling for multiple sTAGs.

As shown by reference number 605, the base station 110 may transmit, to the UE 120 and via the first cell, DCI for PDCCH-ordered CFRA. In some aspects, the DCI has DCI format 1_0. In some aspects, the DCI may support cross-TAG scheduling. For example, the DCI may indicate a TAG of the second cell (e.g., an sTAG of the SCell). Additionally, or alternatively, the DCI may include one or more parameters associated with a random access message to be transmitted by the UE 120 via the second cell. For example, the one or more parameters may relate to a random access payload to be transmitted by the UE 120 (e.g., may include one or more payload parameters that instruct the UE 120 how to generate and/or transmit the RA payload).

As described above, the DCI may indicate a TAG of the second cell. For example, the DCI may indicate the TAG of the second cell in a field that explicitly identifies the TAG (e.g., using a TAG ID). In this case, the UE 120 may use a default SCell configuration for the identified TAG, such as a default SCell configuration indicated in an RRC message. Additionally, or alternatively, the DCI may indicate the TAG using a carrier indicator field (CIF) that indicates an index of an uplink carrier included in the TAG. In this case, the SCell configuration of the indicated uplink carrier may be the same as a default SCell configuration indicated in an RRC message, or may be different from the SCell configuration indicated in the RRC message. In some aspects, the SCell configuration of the indicated uplink carrier may override a default SCell configuration indicated in the RRC message.

In some aspects, the field that indicates the TAG (e.g., the TAG ID field or the CIF) may have a configurable bit width (e.g., of 0 bits, 1 bit, 2 bits, and/or the like). For example, the bit width of the field may depend on a number of TAGs configured for the UE 120. A bit width may refer to a number of bits included in a field. In some aspects, the bit width for the field may be indicated (e.g., explicitly) or inferred (e.g., based at least in part on a number of TAGs configured for the UE 120) based at least in part on a TAG configuration and/or an SCell configuration in an RRC message. For example, the field may have a bit width of zero or may be excluded from the DCI if the UE 120 does not support multiple TAGs and/or is not configured with multiple TAGs. As another example, the field may have a bit width of 1 if the UE 120 supports two TAGs, may have a bit width of two if the UE 120 supports three TAGs or four TAGs, and so on. In some aspects, a specific value of the field (e.g., all bits of the field set to zero) may indicate that the uplink carrier (e.g., to be used for transmission of the RA message) and the downlink carrier (e.g., used to carry the DCI) belong to the same TAG.

Additionally, or alternatively, the DCI may indicate whether the random access message is to be transmitted as part of a two-step random access procedure or a four-step random access procedure. For example, the DCI may include a field that identifies a RACH type as two-step RACH or four-step RACH. In some aspects, this field may include a single bit. A first value of the bit (e.g., zero) may indicate four-step RACH, and a second value of the bit (e.g., one) may indicate two-step RACH.

Additionally, or alternatively, the DCI may indicate a frequency domain resource allocation (FDRA) for transmission of the RA message on the second cell. The FDRA may indicate a set of frequency domain resources to be used by the UE 120 to transmit the RA message on the second cell. For example, the FDRA may be indicated using a frequency domain resource indication value (RIV). In some aspects, the field that indicates the FDRA (e.g., the frequency domain RIV) may have a maximum bit width of $\lceil \log_2 (N_{RB}^{UL,BWP}(N_{RB}^{UL,BWP}+1)/2) \rceil$, where $N_{RB}^{UL,BWP}$ denotes the size of the initial uplink bandwidth part configured for the uplink carrier in the sTAG. In some aspects, if the DCI indicates that the RA message is for four-step RACH, then the UE 120 may ignore the FDRA field, and/or the FDRA field may be set to a specific value (e.g., all ones) to indicate that the FDRA field is to be ignored because the FDRA is for an RA payload, which is not transmitted by the UE 120 in four-step RACH. If the DCI indicates that the RA message is for two-step RACH, then the UE 120 may use the value of the FDRA field (e.g., the frequency domain RIV) to identify a set of frequency domain resources on which the RA payload is to be transmitted on the second carrier.

Because DCI format 1_0 has a limited number of reserved bits (e.g., 10 reserved bits), the number of bits available for the FDRA field may be limited. If the number of bits of the FDRA field is greater than or equal to the frequency domain RIV, then the base station 110 may include the entire frequency domain RIV in the FDRA field. In this case, the value of the FDRA field may be set according to a type 1 resource allocation for the PRU for msgA to indicate the set of frequency domain resources to be used for transmission of msgA. If the number of bits of the FDRA field is less than the frequency domain RIV, then one or more bits (e.g., one or more most significant bits) of the frequency domain RIV may be truncated so that the remaining bits of the frequency domain RIV can be indicated in the FDRA field. Additionally, or alternatively, if the number of bits of the FDRA field is less than the frequency domain RIV, then a granularity of the frequency domain RIV may be modified (e.g., increased from a granularity of 1 resource block (RB) to 2 RBs, and/or the like). In this way, the FDRA can be indicated using a limited number of bits in the DCI.

Additionally, or alternatively, the DCI may indicate a time domain resource allocation (TDRA) for transmission of the RA message on the second cell. The TDRA may indicate a set of time domain resources to be used by the UE 120 to transmit the RA message on the second cell. The TDRA may be indicated in a TDRA field. In some aspects, the TDRA field may have a configurable bit width. For example, a bit width of the TDRA field may be indicated in an RRC message. In some aspects, if the DCI indicates that the RA message is for four-step RACH, then the UE 120 may ignore the TDRA field and/or the TDRA field may be set to a specific value (e.g., all ones) to indicate that the TDRA field is to be ignored because the TDRA is for an RA payload, which is not transmitted by the UE 120 in four-step RACH. If the DCI indicates that the RA message is for two-step RACH, then the UE 120 may use the value of the TDRA field to identify a set of time domain resources on which the RA payload is to be transmitted on the second carrier. The value of the TDRA field may be set according to a time domain resource allocation for the PRU for msgA to indicate the set of time domain resources to be used for transmission of msgA. Thus, in some aspects, the value of the FDRA field and/or the TDRA field may be set according to a RACH type indicated by the DCI.

Additionally, or alternatively, the DCI may indicate a payload size for the RA message (e.g., for the RA payload), a modulation and coding scheme (MCS) to be used for the RA message (e.g., for the RA payload), a rate matching scheme to be used for the RA message (e.g., for the RA payload), and/or a redundancy version to be used for the RA message (e.g., for the RA payload). This information may be indicated in one or more fields of the DCI. The one or more fields may have a configurable bit width (e.g., which may be indicated in an RRC message). In some aspects, the payload size may be explicitly indicated in the DCI. Additionally, or alternatively, the DCI may indicate an MCS and/or a resource allocation, and the UE 120 may infer the payload size based at least in part on the MCS and/or the resource allocation. In some aspects, if the DCI indicates that the RA message is for four-step RACH, then the UE 120 may ignore the one or more fields and/or the one or more fields may be set to a specific value, as indicated above. If the DCI indicates that the RA message is for two-step RACH, then the UE 120 may use the value(s) of the one or more fields to identify a payload size, an MCS, a rate matching scheme, a redundancy version, and/or the like for the RA message. In some aspects, the one or more fields may include an index that maps to a corresponding value for the payload size, the MCS, the rate matching scheme, the redundancy version, and/or the like.

Additionally, or alternatively, the DCI may indicate a demodulation reference signal (DMRS) configuration for the RA message. The DMRS configuration may indicate, for example, one or more DMRS ports, a DMRS sequence, one or more resources to be used for DMRSs, and/or the like. In some aspects, the DMRS configuration for msgA on the sTAG may re-use a CFRA configuration (e.g., a DMRS configuration) of the pTAG. Additionally, or alternatively, the DMRS configuration for msgA on the sTAG may be based at least in part on a msgA preamble configuration for CFRA. The msgA preamble configuration for CFRA may be indicated in system information, an RRC message, and/or the like. Additionally, or alternatively, the UE 120 may receive (e.g., in system information, an RRC message, and/or the like) information that identifies a table for mapping between msgA preambles and corresponding msgA DMRS configurations.

In some aspects, the DCI may indicate a random access preamble index, an SSB index (or an SS/PBCH index), a PRACH mask index, and/or the like. The random access preamble index may indicate the preamble index for msgA for two-step RACH or for MSG1 in four-step RACH. The SSB index may indicate an SSB index to be used to determine a RACH occasion for msgA or MSG1. The PRACH mask index may indicate the index of a RACH occasion of an sTAG uplink carrier associated with the SSB index. In some aspects, with the addition of one or more fields described above, the fields for the random access preamble index, the SSB index, and/or the PRACH mask index may be kept the same size as in legacy DCI having format 1_0, for backward compatibility. Alternatively, the sizes of fields for the random access preamble index, the SSB index, and/or the PRACH mask index may be configurable (e.g., using an RRC message). For example, the bit width of the random access preamble index may be kept at 6 bits for backward compatibility, or may be modified based at least in part on a pool size of preamble sequences associated with CFRA. In some aspects, a specific value of the random access preamble index may indicate CBRA. As another example, the bit width of the SSB index field may be kept at 6 bits for backward compatibility, or may be modified based at least in part on an SSB-to-PRU association rule for two-step RACH. As another example, the bit width of the PRACH mask index field may be kept at 4 bits for backward compatibility, or may be modified based at least in part on a RACH occasion configuration for two-step RACH and/or four-step RACH.

In some aspects, the information for cross-TAG scheduling may be limited to 10 bits due to a number of available (e.g., reserved) bits in DCI. In some aspects, the interpretation of the bits used for cross-TAG scheduling may be indicated in an RRC message.

As shown by reference number 610, a set of cyclic redundancy check (CRC) bits of the DCI may be scrambled. In some aspects, the CRC bits may be scrambled using a cell radio network temporary identifier (C-RNTI), such as a C-RNTI associated with the first cell. In some aspects, the CRC bits may be scrambled using a UE identifier associated with the UE 120. For example, the UE identifier may be a function of the C-RNTI and a TAG index or identifier (e.g., of the sTAG). In some aspects, the UE identifier may be indicated in an RRC message (e.g., on the first cell).

As shown by reference number 615, the UE 120 may determine a timing advance value for the RA message based at least in part on the DCI. Additionally, or alternatively, the UE 120 may generate the RA message based at least in part on the one or more parameters indicated in the DCI. For example, the UE 120 may generate an RA payload based at least in part on one or more payload parameters indicated in the DCI.

As shown by reference number 620, the UE 120 may transmit the RA message (which may include the RA preamble and/or the RA payload) via the second cell. The UE 120 may transmit the RA message with a timing that is based at least in part on the timing advance value determined from the DCI (e.g., an indicated sTAG for the second cell). Additionally, or alternatively, the UE 120 may transmit the RA message according to the one or more parameters indicated in the DCI for transmission of the RA message via the second cell. For example, the UE 120 may transmit an RA payload based at least in part on one or more payload parameters indicated in the DCI for transmission of the RA message via the second cell. In some aspects, the RA message is msgA of a two-step RACH procedure, as described above in connection with FIG. 3. In some aspects, the RA message is MSG1 and/or MSG3 of a four-step RACH procedure.

By indicating information for cross-TAG scheduling in DCI for PDCCH-ordered CFRA, the base station 110 may enable the UE 120 to perform cross-TAG scheduling for PDCCH-ordered CFRA, thereby improving network throughput (e.g., by using carrier aggregation and/or dual connectivity), increasing reliability, reducing latency, and improving performance.

As indicated above, FIG. 6 is provided as an example. Other examples may differ from what is described with regard to FIG. 6.

FIG. 7 is a diagram illustrating another example 700 of supporting cross-TAG scheduling and 2-step RACH payload transmission for a PDCCH-ordered CFRA procedure, in accordance with various aspects of the present disclosure.

As shown in FIG. 7, a UE 120 may communicate with a base station 110 using a first cell (shown as Cell 1) that is included in a first TAG (shown as TAG 1). The first cell may be a primary cell (PCell), and the first TAG may be a pTAG. The first cell may schedule communications for a second cell (shown as Cell 2) that is included in a second TAG (shown as TAG 2) and a third cell (shown as Cell 3) that is included in a third TAG (shown as TAG 3). The first TAG, the second TAG, and the third TAG may all be different. For example, the first TAG may be a pTAG and the second and third TAGs may be different sTAGs. The second cell and the third cell may be different SCells. The first cell, the second cell, and the third cell may be provided by the same base station 110 or by multiple base stations 110.

In some aspects, the sTAG of the second cell is not configured with a scheduling cell (e.g., a scheduling SCell) and the sTAG of the third cell is not configured with a scheduling cell (e.g., a scheduling SCell). Thus, in this case, at least two sTAGs are not configured with a scheduling cell. In this case, a single DCI having format 1_0 is not capable of being used to support cross-TAG scheduling for the sTAG of the second cell and the sTAG of the third cell. FIG. 7 shows details for cross-TAG scheduling for multiple sTAGs.

As shown by reference number 705, the base station 110 may transmit, to the UE 120 and via the first cell, first DCI (shown as DCI A) for PDCCH-ordered CFRA on the second cell. The first DCI may include the information described above in connection with FIG. 6. The first DCI may carry this information for cross-TAG scheduling for the second cell. For example, the first DCI may indicate a TAG of the second cell (e.g., an sTAG), may indicate one or more parameters associated with a random access message to be transmitted by the UE 120 via the second cell, and/or the like, as described above in connection with FIG. 6.

As shown by reference number 710, the base station 110 may transmit, to the UE 120 and via the first cell, second DCI (shown as DCI B) for PDCCH-ordered CFRA on the third cell. The second DCI may include the information described above in connection with FIG. 6. The second DCI may carry this information for cross-TAG scheduling for the third cell. For example, the second DCI may indicate a TAG of the third cell (e.g., an sTAG), may indicate one or more parameters associated with a random access message to be transmitted by the UE 120 via the third cell, and/or the like, as described above in connection with FIG. 6.

As shown by reference number 715, in some aspects, a first set of CRC bits of the first DCI may be scrambled using a first identifier, and a second set of CRC bits of the second DCI may be scrambled using a second identifier. In this case, there may be more CRC overhead for transmission of the first DCI and the second DCI, but the first DCI and the second DCI may both have DCI format 1_0 so that a new DCI format need not be created. As described above in connection with FIG. 6, the identifier used to scramble the CRC bits may be a C-RNTI, a UE identifier (e.g., that is a function of the C-RNTI and an sTAG identifier or sTAG index), and/or the like.

As shown by reference number 720, in some aspects, joint CRC bits of the first DCI and the second DCI may be scrambled using an identifier. In this case, there may be less CRC overhead for transmission of the first DCI and the second DCI, but a new DCI format may be needed. As described above in connection with FIG. 6, the identifier used to scramble the CRC bits may be a C-RNTI, a UE identifier (e.g., that is a function of the C-RNTI and an sTAG identifier or sTAG index), and/or the like.

As shown by reference number 725, the UE 120 may determine a timing advance value for a first RA message to be transmitted on the second cell based at least in part on the first DCI, in a similar manner as described above in connection with FIG. 6. Additionally, or alternatively, the UE 120 may generate the first RA message for the second cell based at least in part on the one or more parameters indicated in the first DCI, in a similar manner as described above in connection with FIG. 6. For example, the UE 120 may generate a first RA payload for the second cell based at least in part on one or more payload parameters indicated in the first DCI. Similarly, the UE 120 may determine a timing advance value for a second RA message to be transmitted on the third cell and/or may generate the second RA message (e.g., a second RA payload) for the third cell based at least in part on the second DCI.

As shown by reference number 730, the UE 120 may transmit a first RA message (which may include a first RA preamble and/or a first RA payload) via the second cell. The UE 120 may transmit the first RA message with a timing that is based at least in part on the timing advance value determined from the first DCI (e.g., an indicated sTAG for the second cell). Additionally, or alternatively, the UE 120 may transmit the first RA message according to one or more parameters indicated in the first DCI for transmission of the first RA message via the second cell. For example, the UE 120 may transmit a first RA payload based at least in part on one or more payload parameters indicated in the first DCI for transmission of the RA message via the second cell. In some aspects, the first RA message is msgA of a two-step RACH procedure, as described above in connection with FIG. 3. In some aspects, the first RA message is MSG1 and/or MSG3 of a four-step RACH procedure.

As shown by reference number 735, the UE 120 may transmit a second RA message (which may include a second RA preamble and/or a second RA payload) via the third cell. The UE 120 may transmit the second RA message with a timing that is based at least in part on the timing advance value determined from the second DCI (e.g., an indicated sTAG for the third cell). Additionally, or alternatively, the UE 120 may transmit the second RA message according to one or more parameters indicated in the second DCI for transmission of the second RA message via the third cell. For example, the UE 120 may transmit a second RA payload based at least in part on one or more payload parameters indicated in the second DCI for transmission of the RA message via the third cell. In some aspects, the second RA message is msgA of a two-step RACH procedure, as described above in connection with FIG. 3. In some aspects, the second RA message is MSG1 and/or MSG3 of a four-step RACH procedure.

By indicating information for cross-TAG scheduling in DCI for PDCCH-ordered CFRA, the base station 110 may enable the UE 120 to perform cross-TAG scheduling for PDCCH-ordered CFRA, thereby improving network throughput (e.g., by using carrier aggregation and/or dual connectivity), increasing reliability, reducing latency, and improving performance.

As indicated above, FIG. 7 is provided as an example. Other examples may differ from what is described with regard to FIG. 7.

Figure 8:
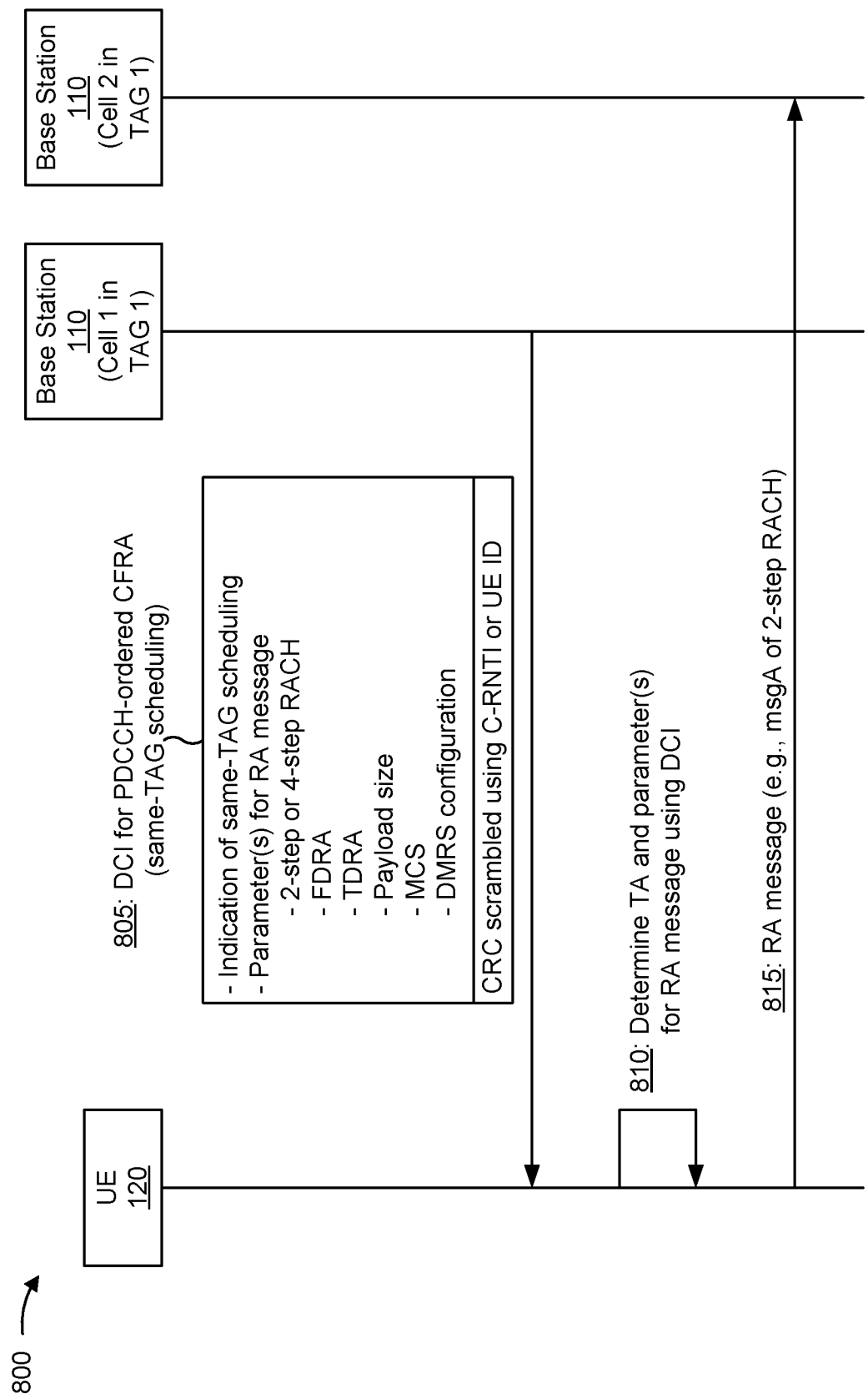

FIG. 8 is a diagram illustrating another example 800 of supporting cross-TAG scheduling and 2-step RACH payload transmission for a PDCCH-ordered CFRA procedure, in accordance with various aspects of the present disclosure.

As shown in FIG. 8, a UE 120 may communicate with a base station 110 using a first cell (shown as Cell 1) that is included in a first TAG (shown as TAG 1). The first cell may be a primary cell (PCell), and the first TAG may be a pTAG. The first cell may schedule communications for a second cell (shown as Cell 2) that is also included in the first TAG (TAG 1). Thus, the first cell and the second cell may belong to the same TAG in this scenario. The second cell may be a secondary cell (SCell), and the second TAG may be an sTAG. The first cell and the second cell may be provided by the same base station 110 or by different base stations 110.

In example 800, the sTAG of the second cell is configured with a scheduling cell. In this case, the DCI need not support cross-TAG scheduling because the first cell and the second cell are in the same TAG. However, the DCI may still need to support resource assignment and other configurations for msgA payload transmission on the second cell as part of a two-step RACH procedure performed on the second cell.

As shown by reference number 805, the base station 110 may transmit, to the UE 120 and via the first cell, DCI for PDCCH-ordered CFRA. In some aspects, the DCI has DCI format 1_0. The DCI may include one or more parameters associated with the RA message (e.g., an RA preamble, an RA payload, msgA, and/or the like), as described above in connection with FIG. 6. For example, the DCI may indicate whether the random access message is to be transmitted as part of a two-step random access procedure or a four-step random access procedure, a frequency domain resource allocation for the random access message, a time domain resource allocation for the random access message, a payload size of the random access message, a modulation and coding scheme for the random access message, a rate matching scheme for the random access message, a redundancy version for the random access message, a demodulation reference signal resource configuration for the random access message, and/or the like. In some aspects, the one or more parameters may be indicated using a set of reserved bits of the DCI that do not indicate a random access preamble index, a synchronization signal block index, a physical random access channel mask index, and/or the like.

In some aspects, the DCI may indicate a TAG of the second cell (e.g., an sTAG). For example, the DCI may indicate that a TAG of the second cell, in which the RA message is to be transmitted, is the same as a TAG of the first cell in which the DCI is received. For example, a field in DCI that indicates a TAG of the second cell (e.g., TAG ID field, a CIF field, and/or the like) may be set to a value that indicates that the TAG of the second cell is the same as the TAG of the first cell.

Additionally, or alternatively, DCI for same-TAG scheduling may use a different CRC mask than DCI from cross-TAG scheduling. In this case, the base station 110 may apply a different CRC mask to DCI for cross-TAG scheduling as compared to DCI for same-TAG scheduling, and the UE 120 may determine whether the DCI is for cross-TAG scheduling or same-TAG scheduling based at least in part on the CRC mask. In some aspects, a different identifier for scrambling CRC bits may be used for DCI for cross-TAG scheduling as compared to DCI for same-TAG scheduling. For example, the base station 110 may scramble DCI for same-TAG scheduling using a C-RNTI, and may scramble DCI for cross-TAG scheduling using an identifier other than C-RNTI (e.g., such as by using a UE identifier that is a function of the C-RNTI and an sTAG identifier or index).

Additionally, or alternatively, the base station 110 may indicate that the DCI is for same-TAG scheduling using an indication in an RRC message. Additionally, or alternatively, the base station 110 may assign a different preamble to the UE 120 for PDCCH-ordered CFRA depending on whether the DCI is for same-TAG scheduling or cross-TAG scheduling. For example, a first set of preambles may be used for same-TAG scheduling, and a second (e.g., mutually exclusive) set of preambles may be used for cross-TAG scheduling. The base station 110 may select from either the first set of preambles or the second set of preambles based at least in part on whether the DCI is for same-TAG scheduling or cross-TAG scheduling, and may indicate the selected preamble in the DCI. The UE 120 may determine whether the DCI is for same-TAG scheduling or cross-TAG scheduling based at least in part on the preamble indicated in the DCI.

As shown by reference number 810, the UE 120 may determine a timing advance value for the RA message based at least in part on the DCI. For example, the UE 120 may determine the timing advance value based at least in part on determining that the first cell and the second cell are included in the same TAG. Additionally, or alternatively, the UE 120 may generate the RA message based at least in part on the one or more parameters indicated in the DCI. For example, the UE 120 may generate an RA payload based at least in part on one or more payload parameters indicated in the DCI.

As shown by reference number 815, the UE 120 may transmit the RA message (which may include the RA preamble and/or the RA payload) via the second cell. The UE 120 may transmit the RA message with a timing that is based at least in part on the timing advance value determined from the DCI (e.g., an indication of same-TAG scheduling). Additionally, or alternatively, the UE 120 may transmit the RA message according to the one or more parameters indicated in the DCI for transmission of the RA message via the second cell. For example, the UE 120 may transmit an RA payload based at least in part on one or more payload parameters indicated in the DCI for transmission of the RA message via the second cell. In some aspects, the RA message is msgA of a two-step RACH procedure, as described above in connection with FIG. 3.

By indicating information for transmission of msgA in DCI for PDCCH-ordered CFRA, the base station 110 may enable the UE 120 to perform a two-step RACH procedure for PDCCH-ordered CFRA, thereby reducing latency and improving performance.

As indicated above, FIG. 8 is provided as an example. Other examples may differ from what is described with regard to FIG. 8.

Figure 9:
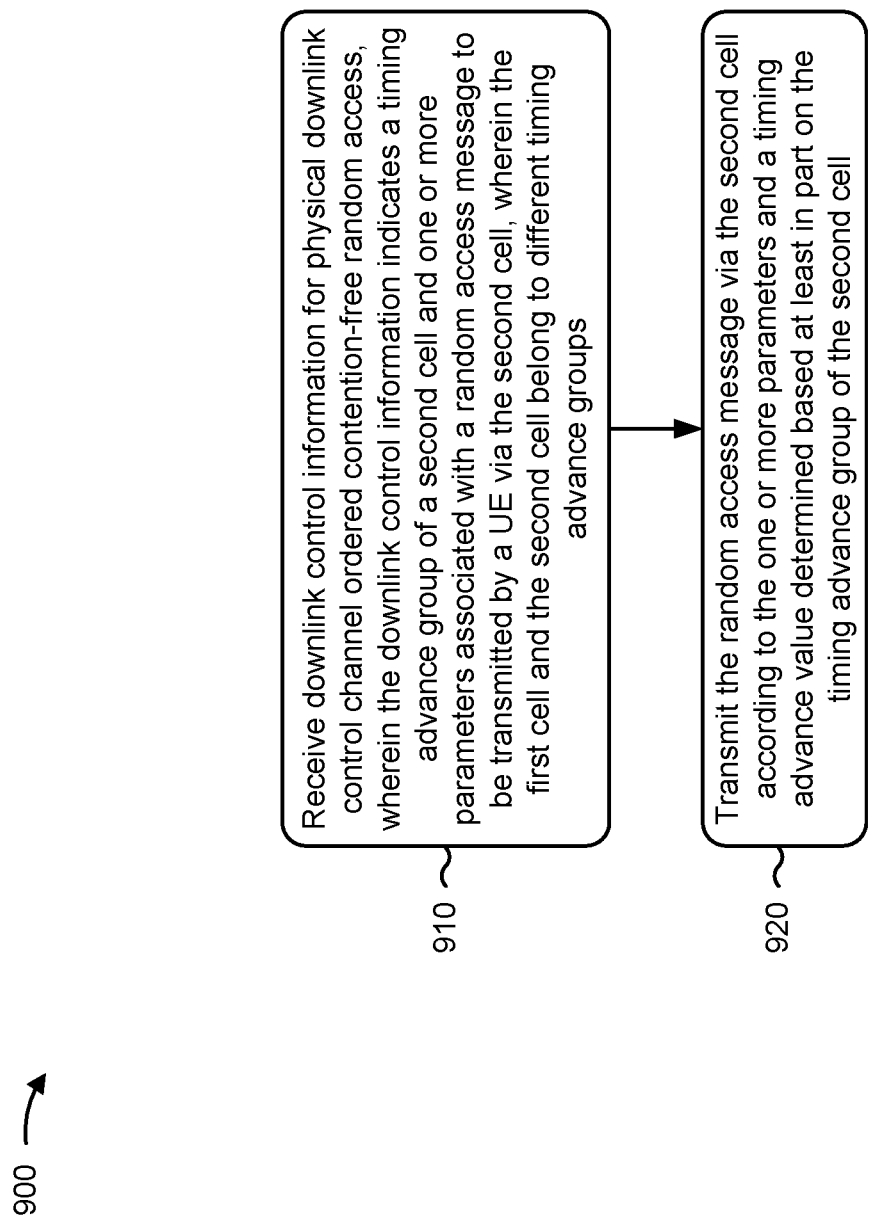
FIGS. 9 and 10 are diagrams illustrating example processes performed, for example, by a user equipment, in accordance with various aspects of the present disclosure.

FIG. 9 is a diagram illustrating an example process 900 performed, for example, by a UE, in accordance with various aspects of the present disclosure. Example process 900 is an example where a UE (e.g., UE 120 and/or the like) performs operations associated with supporting cross-TAG scheduling and 2-step RACH payload transmission for a PDCCH-ordered contention-free random access procedure.

As shown in FIG. 9, in some aspects, process 900 may include receiving, via a first cell, downlink control information for physical downlink control channel ordered contention-free random access, wherein the downlink control information indicates a timing advance group of a second cell and one or more parameters associated with a random access message to be transmitted by the UE via the second cell, wherein the first cell and the second cell belong to different timing advance groups (block 910). For example, the UE (e.g., using receive processor 258, controller/processor 280, memory 282, and/or the like) may receive, via a first cell, downlink control information for physical downlink control channel ordered contention-free random access, as described above. In some aspects, the downlink control information indicates a timing advance group of a second cell and one or more parameters associated with a random access message to be transmitted by the UE via the second cell. In some aspects, the first cell and the second cell belong to different timing advance groups.

As further shown in FIG. 9, in some aspects, process 900 may include transmitting the random access message via the second cell according to the one or more parameters and a timing advance value determined based at least in part on the timing advance group of the second cell (block 920). For example, the UE (e.g., using transmit processor 264, controller/processor 280, memory 282, and/or the like) may transmit the random access message via the second cell according to the one or more parameters and a timing advance value determined based at least in part on the timing advance group of the second cell, as described above.

Process 900 may include additional aspects, such as any single aspect or any combination of aspects described below and/or in connection with one or more other processes described elsewhere herein.

In a first aspect, the random access message includes at least one of a random access preamble, a random access payload, or a combination thereof.

In a second aspect, alone or in combination with the first aspect, the timing advance group of the second cell is not configured with a scheduling secondary cell and all other timing advance groups associated with the UE are configured with a scheduling cell.

In a third aspect, alone or in combination with one or more of the first and second aspects, the downlink control information indicates whether the random access message is to be transmitted as part of a two-step random access procedure or a four-step random access procedure.

In a fourth aspect, alone or in combination with one or more of the first through third aspects, the downlink control information indicates the timing advance group of the second cell in a field that includes a timing advance group identifier or a carrier indicator that identifies an index of an uplink carrier in the timing advance group.

In a fifth aspect, alone or in combination with one or more of the first through fourth aspects, a bit width of the field is indicated in a radio resource control message.

In a sixth aspect, alone or in combination with one or more of the first through fifth aspects, the one or more parameters indicate a frequency domain resource allocation for the random access message.

In a seventh aspect, alone or in combination with one or more of the first through sixth aspects, the one or more parameters indicate a time domain resource allocation for the random access message.

In an eighth aspect, alone or in combination with one or more of the first through seventh aspects, the one or more parameters indicate at least one of a payload size, a modulation and coding scheme, a rate matching scheme, or a redundancy version associated with the random access message.

In a ninth aspect, alone or in combination with one or more of the first through eighth aspects, the one or more parameters indicate a demodulation reference signal resource configuration for the random access message.

In a tenth aspect, alone or in combination with one or more of the first through ninth aspects, the downlink control information includes a field to indicate a random access preamble index, a field to indicate a synchronization signal block index, a field to indicate a physical random access channel mask index, and a set of reserved bits to indicate at least one of: whether the random access message is to be transmitted as part of a two-step random access procedure or a four-step random access procedure, the timing advance group of the second cell, a frequency domain resource allocation for the random access message, a time domain resource allocation for the random access message, a payload size associated with the random access message, a modulation and coding scheme for the random access message, a rate matching scheme for the random access message, a redundancy version for the random access message, a demodulation reference signal resource configuration for the random access message, or a combination thereof.

In an eleventh aspect, alone or in combination with one or more of the first through tenth aspects, cyclic redundancy check bits of the downlink control information are scrambled using at least one of: a cell radio network temporary identifier, or a UE identifier that is a function of the cell radio network temporary identifier and a timing advance group index.

In a twelfth aspect, alone or in combination with one or more of the first through eleventh aspects, the timing advance group of the second cell is not configured with a scheduling secondary cell and at least one other timing advance group associated with the UE is not configured with a scheduling cell.

In a thirteenth aspect, alone or in combination with one or more of the first through twelfth aspects, process 900 includes receiving, via the first cell, second downlink control information for physical downlink control channel ordered contention-free random access, and the second downlink control information indicates a second timing advance group of a third cell and one or more second parameters associated with a second random access message to be transmitted by the UE via the third cell, and the third cell belongs to a different timing advance group than the first cell and the second cell; and transmitting the second random access message via the third cell according to the one or more second parameters and a second timing advance value determined based at least in part on the second timing advance group of the third cell.

In a fourteenth aspect, alone or in combination with one or more of the first through thirteenth aspects, first cyclic redundancy check bits of the downlink control information are scrambled using a first identifier and second cyclic redundancy check bits of the second downlink control information are scrambled using a second identifier.

In a fifteenth aspect, alone or in combination with one or more of the first through fourteenth aspects, joint cyclic redundancy check bits of the downlink control information and the second downlink control information are scrambled using an identifier.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
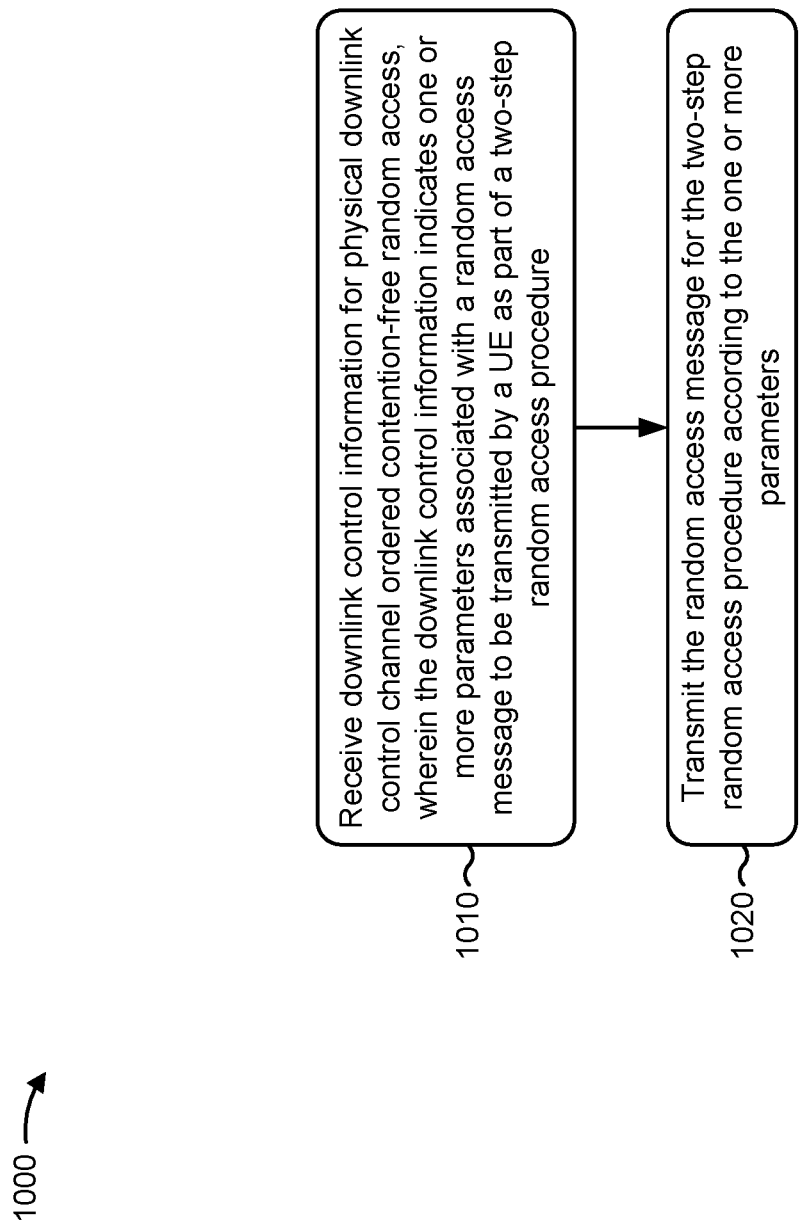

FIG. 10 is a diagram illustrating an example process 1000 performed, for example, by a UE, in accordance with various aspects of the present disclosure. Example process 1000 is an example where a UE (e.g., UE 120 and/or the like) performs operations associated with supporting cross-TAG scheduling and 2-step RACH payload transmission for a PDCCH-ordered contention-free random access procedure.

As shown in FIG. 10, in some aspects, process 1000 may include receiving downlink control information for physical downlink control channel ordered contention-free random access, wherein the downlink control information indicates one or more parameters associated with a random access message to be transmitted by the UE as part of a two-step random access procedure (block 1010). For example, the UE (e.g., using receive processor 258, controller/processor 280, memory 282, and/or the like) may receive downlink control information for physical downlink control channel ordered contention-free random access, as described above. In some aspects, the downlink control information indicates one or more parameters associated with a random access message to be transmitted by the UE as part of a two-step random access procedure.

As further shown in FIG. 10, in some aspects, process 1000 may include transmitting the random access message for the two-step random access procedure according to the one or more parameters (block 1020). For example, the UE (e.g., using transmit processor 264, controller/processor 280, memory 282, and/or the like) may transmit the random access message for the two-step random access procedure according to the one or more parameters, as described above.

Process 1000 may include additional aspects, such as any single aspect or any combination of aspects described below and/or in connection with one or more other processes described elsewhere herein.

In a first aspect, the random access message includes at least one of a random access preamble, a random access payload, or a combination thereof.

In a second aspect, alone or in combination with the first aspect, the one or more parameters indicate at least one of: whether the random access message is to be transmitted as part of a two-step random access procedure or a four-step random access procedure, a frequency domain resource allocation for the random access message, a time domain resource allocation for the random access message, a payload size of the random access message, a modulation and coding scheme for the random access message, a rate matching scheme for the random access message, a redundancy version for the random access message, a demodulation reference signal resource configuration for the random access message, or a combination thereof.

In a third aspect, alone or in combination with one or more of the first and second aspects, the downlink control information includes a field to indicate a random access preamble index, a field to indicate a synchronization signal block index, a field to indicate a physical random access channel mask index, and a set of reserved bits to indicate the one or more parameters.

In a fourth aspect, alone or in combination with one or more of the first through third aspects, process 1000 includes receiving an indication that a timing advance group associated with transmission of the random access message is the same as a timing advance group associated with a cell via which the downlink control information is received.

In a fifth aspect, alone or in combination with one or more of the first through fourth aspects, the indication is included in at least one of a radio resource control message or a field in the downlink control information.

In a sixth aspect, alone or in combination with one or more of the first through fifth aspects, the indication is based at least in part on at least one of a preamble indicated in the downlink control information, a demodulation reference signal configuration indicated in the downlink control information, a cyclic redundancy check mask applied to the downlink control information, an identifier used for scrambling cyclic redundancy check bits of the downlink control information, or a combination thereof.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
receiving, via a first cell, downlink control information for physical downlink control channel ordered contention-free random access, wherein the downlink control information indicates a timing advance group of a second cell and one or more parameters associated with a random access message to be transmitted by the UE via the second cell, wherein the first cell and the second cell belong to different timing advance groups,
wherein the downlink control information includes one or more bits indicating whether the random access message is to be transmitted as part of a two-step random access procedure or a four-step random access procedure; and
transmitting, based on receiving the downlink control information, the random access message via the second cell according to the one or more parameters and a timing advance value determined based at least in part on the timing advance group of the second cell.

2. The method of claim 1, wherein the random access message includes at least one of a random access preamble, a random access payload, or a combination thereof.

3. The method of claim 1, wherein the timing advance group of the second cell is not configured with a scheduling secondary cell and all other timing advance groups associated with the UE are configured with a scheduling cell.

4. The method of claim 1, wherein the downlink control information indicates the timing advance group of the second cell in a field that includes a timing advance group identifier or a carrier indicator that identifies an index of an uplink carrier in the timing advance group.

5. The method of claim 4, wherein a bit width of the field is indicated in a radio resource control message.

6. The method of claim 1, wherein the one or more parameters indicate a frequency domain resource allocation for the random access message.

7. The method of claim 1, wherein the one or more parameters indicate a time domain resource allocation for the random access message.

8. The method of claim 1, wherein the one or more parameters indicate at least one of a payload size, a modulation and coding scheme, a rate matching scheme, or a redundancy version associated with the random access message.

9. The method of claim 1, wherein the one or more parameters indicate a demodulation reference signal resource configuration for the random access message.

10. The method of claim 1, wherein the downlink control information includes a field to indicate a random access preamble index, a field to indicate a synchronization signal block index, a field to indicate a physical random access channel mask index, and a set of reserved bits that includes the one or more bits, the set of reserved bits to indicate at least one of:
whether the random access message is to be transmitted as part of the two-step random access procedure or the four-step random access procedure,
the timing advance group of the second cell,
a frequency domain resource allocation for the random access message,
a time domain resource allocation for the random access message,
a payload size associated with the random access message,
a modulation and coding scheme for the random access message,
a rate matching scheme for the random access message,
a redundancy version for the random access message,
a demodulation reference signal resource configuration for the random access message, or
a combination thereof.

11. The method of claim 1, wherein cyclic redundancy check bits of the downlink control information are scrambled using at least one of:
a cell radio network temporary identifier, or
a UE identifier that is a function of the cell radio network temporary identifier and a timing advance group index.

12. The method of claim 1, wherein the timing advance group of the second cell is not configured with a scheduling secondary cell and at least one other timing advance group associated with the UE is not configured with a scheduling cell.

13. The method of claim 1, further comprising:
receiving, via the first cell, second downlink control information for physical downlink control channel ordered contention-free random access, wherein the second downlink control information indicates a second timing advance group of a third cell and one or more second parameters associated with a second random access message to be transmitted by the UE via the third cell, wherein the third cell belongs to a different timing advance group than the first cell and the second cell; and
transmitting the second random access message via the third cell according to the one or more second parameters and a second timing advance value determined based at least in part on the second timing advance group of the third cell.

14. The method of claim 13, wherein first cyclic redundancy check bits of the downlink control information are scrambled using a first identifier and second cyclic redundancy check bits of the second downlink control information are scrambled using a second identifier.

15. The method of claim 13, wherein joint cyclic redundancy check bits of the downlink control information and the second downlink control information are scrambled using an identifier.

16. A method of wireless communication performed by a user equipment (UE), comprising:
receiving downlink control information for physical downlink control channel ordered contention-free random access, wherein the downlink control information indicates one or more parameters associated with a random access message to be transmitted by the UE as part of a two-step random access procedure,
wherein the downlink control information includes one or more bits indicating that the random access message is to be transmitted as part of the two-step random access procedure; and
transmitting, based on receiving the downlink control information, the random access message for the two-step random access procedure according to the one or more parameters.

17. The method of claim 16, wherein the random access message includes at least one of a random access preamble, a random access payload, or a combination thereof.

18. The method of claim 16, wherein the one or more parameters indicate at least one of:
whether the random access message is to be transmitted as part of the two-step random access procedure or a four-step random access procedure, a frequency domain resource allocation for the random access message,
a time domain resource allocation for the random access message,
a payload size of the random access message,
a modulation and coding scheme for the random access message,
a rate matching scheme for the random access message,
a redundancy version for the random access message,
a demodulation reference signal resource configuration for the random access message, or
a combination thereof.

19. The method of claim 16, wherein the downlink control information includes a field to indicate a random access preamble index, a field to indicate a synchronization signal block index, a field to indicate a physical random access channel mask index, and a set of reserved bits, including the one or more bits, to indicate the one or more parameters.

20. The method of claim 16, further comprising receiving an indication that a timing advance group associated with transmission of the random access message is the same as a timing advance group associated with a cell via which the downlink control information is received.

21. The method of claim 20, wherein the indication is included in at least one of a radio resource control message or a field in the downlink control information.

22. The method of claim 20, wherein the indication is based at least in part on at least one of a preamble indicated in the downlink control information, a demodulation reference signal configuration indicated in the downlink control information, a cyclic redundancy check mask applied to the downlink control information, an identifier used for scrambling cyclic redundancy check bits of the downlink control information, or a combination thereof.

23. A user equipment (UE) for wireless communication, comprising:
a memory; and
one or more processors coupled to the memory, the one or more processors configured to:
receive, via a first cell, downlink control information for physical downlink control channel ordered contention-free random access, wherein the downlink control information indicates a timing advance group of a second cell and one or more parameters associated with a random access message to be transmitted by the UE via the second cell, wherein the first cell and the second cell belong to different timing advance groups,
wherein the downlink control information includes one or more bits indicating whether the random access message is to be transmitted as part of a two-step random access procedure or a four-step random access procedure; and
transmit, based on receiving the downlink control information via the first cell, the random access message via the second cell according to the one or more parameters and a timing advance value determined based at least in part on the timing advance group of the second cell.

24. The UE of claim 23, wherein the timing advance group of the second cell is not configured with a scheduling secondary cell and all other timing advance groups associated with the UE are configured with a scheduling cell.

25. The UE of claim 23, wherein the one or more bits comprise a set of reserved bits.

26. The UE of claim 23, wherein the downlink control information indicates the timing advance group of the second cell in a field that includes a timing advance group identifier or a carrier indicator that identifies an index of an uplink carrier in the timing advance group.

27. The UE of claim 23, wherein the timing advance group of the second cell is not configured with a scheduling secondary cell and at least one other timing advance group associated with the UE is not configured with a scheduling cell.

28. The UE of claim 23, wherein the one or more processors are further configured to:
receive, via the first cell, second downlink control information for physical downlink control channel ordered contention-free random access, wherein the second downlink control information indicates a second timing advance group of a third cell and one or more second parameters associated with a second random access message to be transmitted by the UE via the third cell, wherein the third cell belongs to a different timing advance group than the first cell and the second cell; and
transmit the second random access message via the third cell according to the one or more second parameters and a second timing advance value determined based at least in part on the second timing advance group of the third cell.

29. A user equipment (UE) for wireless communication, comprising:
a memory; and
one or more processors coupled to the memory, the one or more processors configured to:
receive downlink control information for physical downlink control channel ordered contention-free random access, wherein the downlink control information indicates one or more parameters associated with a random access message to be transmitted by the UE as part of a two-step random access procedure,
wherein the downlink control information includes one or more bits indicating that the random access message is to be transmitted as part of the two-step random access procedure; and
transmit, based on receiving the downlink control information, the random access message for the two-step random access procedure according to the one or more parameters.

30. The UE of claim 29, wherein the downlink control information includes a field to indicate a random access preamble index, a field to indicate a synchronization signal block index, a field to indicate a physical random access channel mask index, and a set of reserved bits to indicate the one or more parameters.

* * * * *